T. B. Smith,
Cutting Veneers.
Nº 66,997. Patented July 23, 1867.
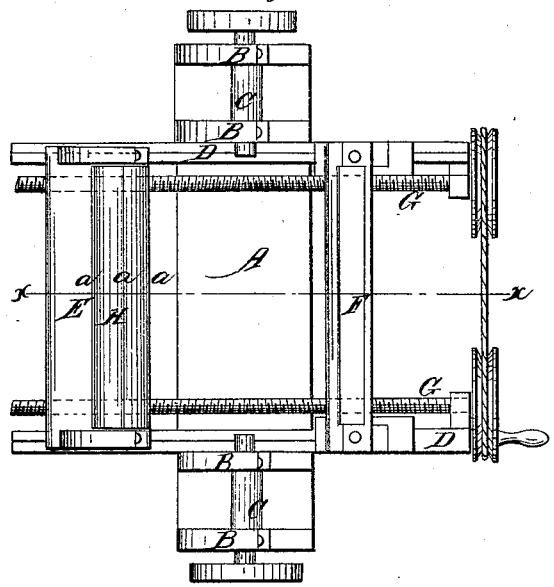
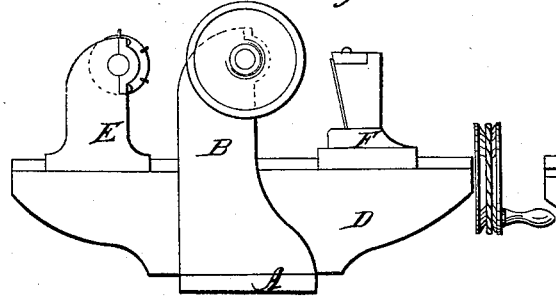
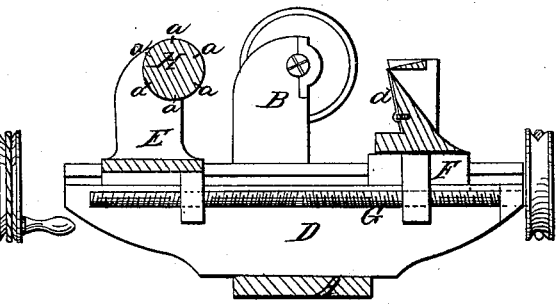
Witnesses
John H. Shumway
A. J. Tibbits
Inventor
T. B. Smith
By his Attorney
John E. Earle

United States Patent Office.

T. B. SMITH, OF ANSONIA, CONNECTICUT.

Letters Patent No. 66,997, dated July 23, 1867.

---

IMPROVEMENT IN MACHINES FOR CUTTING VENEERS.

---

The Schedule referred to in these Letters Patent and making part of the same.

---

TO ALL WHOM IT MAY CONCERN:

Be it known that I, T. B. SMITH, of Ansonia, in the county of New Haven, and State of Connecticut, have invented a new Improvement in Machine for Cutting Veneers; and I do hereby declare the following, when taken in connection with the accompanying drawings and the letters of reference marked thereon, to be a full, clear, and exact description of the same, and which said drawings constitute part of this specification, and represent in—

Figure 1 a top view.

Figure 2 an end view, and in

Figure 3 a central section on line $x\ x$.

This invention relates to an improvement in machines such as are used for cutting veneers from the surface of a revolving block, its object being to slit the veneer into narrow cuts during the process of shaving, so that it is delivered in strips instead of sheets, and consists in the combination of a revolving cutter cylinder with a stationary cutter, arranged upon their respective carriages so as to move to or from each other, the cutters upon the cylinder operating upon one side of a revolving block, and the fixed cutter upon the opposite side of the same block, to shave the strips previously slit by the cutters on the cylinder.

In order to the clear understanding of my invention, as well as to enable others to construct the same, I will proceed to a description thereof, as illustrated in the accompanying drawings.

A is the bed-plate, supporting in proper bearings B, at each end, a mandrel, C, each being provided with an apparatus in its inner end for holding the block in the usual manner, and the block caused to revolve by the application of power to one or both of the mandrels, in the usual manner for similar machines. D D are guides running transversely across the bed A, supporting two carriages E E, which said carriages are moved in opposite directions, to or from the centre, by the application of power to right and left screws G G, or other equivalent device, so as to work the two carriages parallel to each other. Upon the one carriage, E, in proper bearings, is arranged a cylinder, H, provided upon its surface with cutters $a$ extending longitudinally across the cylinder, as seen in figs. 1 and 3, the said cutters protruding a short distance from the face of the cylinder; the other carriage E has fixed upon it a stationary cutter, $d$.

The block is placed between the mandrels and caused to revolve, and the two cutters brought up against the block, so that the cutters upon the cylinder H will slit the surface of the cylinder, and the cutter $d$ upon the opposite side shave the surface to the depth of the slits, and the relative feed given to each carriage should be such that the depth of the cut shall be to give the thickness required, the cut strips passing out over the cutter $d$, as denoted in red, fig. 3.

By the arrangement of the two carriages the cutters upon the cylinder of one carriage and the stationary cutter upon the other are at all times exposed to view, and may be readily adjusted, the one independent of the other, and if at any time it is desirable not to use the cylinder cutter, it can be simply slipped back and only the stationary cutter used.

I do not broadly claim the combination of a cylinder provided with longitudinal cutters and a stationary cutter, as such is not new, but having thus fully described my invention, what I do claim as new and useful, and desire to secure by Letters Patent, is—

The cylinder H with its cutters $a$ upon a carriage E, and the stationary cutter $d$ upon its carriage E, with the mandrel C, when arranged so that the two carriages are moved to present the cutters upon opposite sides, substantially as and for the purpose herein set forth.

T. B. SMITH.

Witnesses:
HOWARD COLBURN,
MARY COLBURN.